United States Patent [19]

Miele, Jr. et al.

[11] 4,092,866
[45] June 6, 1978

[54] PRESSURE GAUGE CASE

[75] Inventors: Raymond D. Miele, Jr., Springfield, N.J.; Roy E. Watson, Marshalltown, Iowa

[73] Assignee: Eltra Corporation, Toledo, Ohio

[21] Appl. No.: 777,209

[22] Filed: Mar. 14, 1977

[51] Int. Cl.² .................. G01D 11/26; G04B 39/00
[52] U.S. Cl. .................................. 73/431; 58/91; 220/82 A
[58] Field of Search .............. 73/431, 300, 418; 58/90 R, 91; 220/82 A, 319, 320, 80, 67

[56] References Cited

U.S. PATENT DOCUMENTS

| | | | |
|---|---|---|---|
| 2,714,469 | 8/1955 | Carlson | 220/320 |
| 2,748,976 | 6/1956 | Magnesen | 220/320 |
| 2,854,815 | 10/1958 | Piquerez | 58/91 X |
| 2,866,940 | 12/1958 | Lamb | 73/431 X |
| 3,370,470 | 2/1968 | Neugebauer | 73/431 |
| 3,505,722 | 4/1970 | Ullman | 220/67 X |
| 3,543,586 | 12/1970 | Waite | 73/431 |
| 3,831,449 | 8/1974 | MacNiel et al. | 73/300 |
| 3,972,239 | 8/1976 | Puster et al. | 58/91 X |

Primary Examiner—Daniel M. Yasich
Attorney, Agent, or Firm—Robert E. Greenstien

[57] ABSTRACT

A container for a pressure gauge movement which employs a viewing window. The container includes a flange along the edge adjacent to the window which receives the window and a resilient window sealing gasket. A resilient collar is placed around the edge of the window which sandwiches the gasket between the window and flange as it retracts. The collar includes a split and two non-parallel surfaces. The split allows the collar to be expanded when placed around the flange and window. The surfaces define a groove to receive the edges and press the flange and window together around the gasket as the collar retracts. A ring is placed over the collar which contains a plurality of detents and a window contacting surface. The detents engage the collar and cause it to contract and also lock the ring and collar in place on the case. At the same time, the surface presses the window against the gasket.

6 Claims, 4 Drawing Figures

PRESSURE GAUGE CASE

BACKGROUND OF THE INVENTION

This invention relates to a case or container for housing a pressure gauge movement. More specifically, this invention relates to a case construction which utilizes a rather simple and economical apparatus for mounting a viewing window.

It is well known in the art that pressure gauges frequently use a Bourdon tube to convert the fluid or gas pressure into an observable needle or pointer movement, references to a graduated dial. These pressure gauges often are filled with oil to dampen pointer vibration. A Bourdon tube can rupture and raise the pressure in the case and thereby dislodge the viewing window. To prevent a pressure build-up in the case, pressure release devices are used, such as a blow-off safety back (shown herein), an expandable, diaphramatic case back or a pressure release valve.

Since the case intended for this type of application may be oil filled, the viewing window should be in a fluid sealing relation to the case end and should not dislodge before the pressure release functions. Furthermore, the arrangement employed for retaining the viewing window should facilitate easy removal of the window for access to the gauge movement for calibration (zeroing) and repair. In addition, the apparatus or arrangement should facilitate easy and economical assembly of the complete pressure gauge. Lastly, special tools or machinery should not be required to assemble and disassemble the complete gauge.

It can be observed that various techniques for mounting a viewing window on a gauge case are disclosed in the prior art. In general, screws or somewhat complicated collar arrangements are employed which may necessitate the use of special tools or machinery for mounting and dismounting the viewing window. For example, in FIG. 4 of U.S. Pat. No. 3,370,470, the ring 26, which consists of a thin copper sheet, is positioned along the sidewall 2 of the gauge case so as to press the window or disc against a resilient gasket. With disc 17 thus placed against the gasket, ring 26 is bent into groove 25 on the sidewall 2 of the case. Solely for cosmetic purposes, a cover 19 is provided over ring 26, which is fastened to the case wall by a plurality of screws. It should be observed that mounting the viewing window in this manner requires the use of special tools to bend ring 26 into groove 25. It follows that to remove the viewing window, special tools are also required to unbend the ring from the groove, and it is likely that ring 26 will be distorted or deformed when removed and cannot be reused to remount the window.

SUMMARY OF THE INVENTION

In the apparatus of the present invention, a flange is provided along the open end of the gauge case. This flange contains a groove which accommodates a resilient gasket or seal, preferably an o-ring. The transparent viewing window is placed against the gasket and then a collar is placed around the edge of the window and the flange. This collar contains a split which allows the collar to be spread or expanded as it is being placed around the edges of the window and the flange. Then a ring is placed around the collar, which causes it to contract radially inward. The ring contains detents along its outer edge which engage the collar so as to lock both the ring and collar in place and, at the same time, contract the collar. As the collar contracts, the gasket is squeezed between the window and flange. The ring is placed over the collar by moderate or slight pressure. With the ring in place, the window can be removed only if the ring is removed first. The pressure applied by the collar to the window and flange is distributed uniformly along the circumference of the collar and thereby assures that a proper seal is effected. The collar and ring are reusable and easily removed by hand, thus eliminating the need for special tools.

Thus, it is an object of the present invention to provide an apparatus for mounting a viewing window on a pressure gauge case which is removable by hand and permits reuse of the window mounting parts included in the apparatus.

It is another object of the present invention to provide a window mounting apparatus by which the window and pressure gauge case achieve a consistent and uniform fluid seal relation.

It is another object of the present invention to provide a window mounting apparatus that will retain the window in place on the pressure gauge case despite fluid or gas pressure in the case.

Still further and additional objects and features of the present invention be become apparent to those skilled in the art from the following drawing, detailed description and claims, wherein:

DETAILED DESCRIPTION

Figure 1:
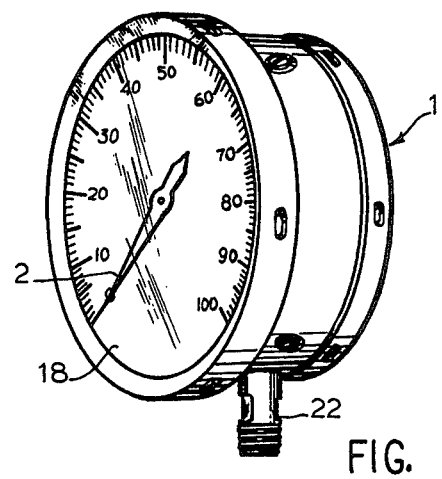
FIG. 1 is a perspective view of the pressure gauge employing the mounting apparatus of the present invention.

Referring to FIG. 1 of the drawing, a pressure gauge 1 is shown which includes a graduated dial 18 and an indicator pointer 2 which moves relative to the dial. A threaded nipple inlet 22 extends through the bottom of pressure gauge 1. Inlet 22 connects to a Bourdon tube (not shown herein), in the interior of gauge 1. Fluid or gas pressure is transmitted to the Bourdon tube through nipple 22 which causes the tube to expand or contract. A gear mechanism (not shown) connects the Bourdon tube to pointer 2, so that, the tube movement, in response to the fluid or gas pressure is translated into rotational movement of pointer 2.

Figure 2:
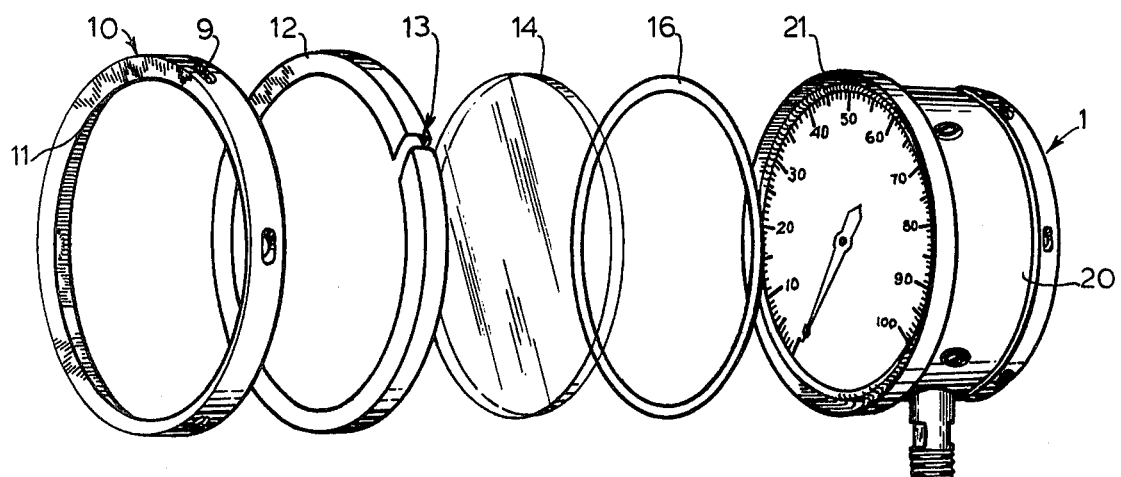
FIG. 2 is an exploded perspective view of the gauge depicted in FIG. 1.
Figure 3:
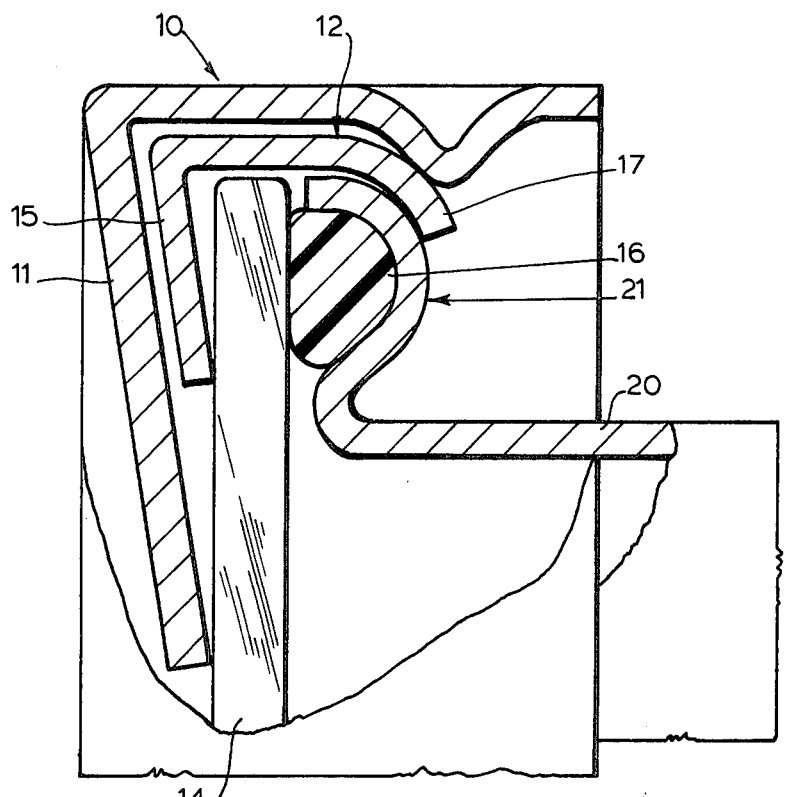
FIG. 3 is a partial cross-sectional view along line 3—3 in FIG. 1 depicting the window mounting apparatus with the ring installed.

Referring to FIG. 2, pressure gauge 1 can be seen to comprise a cylindrical container or case 20, the wall of which extends radially outward at the open end (window end) of the case to define a flange 21. As shown in FIG. 3, flange 21 receives the window 14, and includes a groove to accept the gasket 16 to seal the interface between window 14 and flange 21.

A collar 12 is placed around window 14 and flange 21, which includes a split 13 and the somewhat non-parallel surfaces 15 and 17 (FIGS. 2 and 3). Collar 12 is resilient and preferably constructed of a metallic or plastic material. Split 13 allows collar 12 to be spread or expanded when it is placed around window 14 and flange 21, as shown. The resiliency of collar 12 causes it to contract around window 14 and flange 21 after it is in place, so that gasket 16 is sandwiched between window and the flange. In addition, this resiliency also allows surfaces 15 and 17 to spread apart slightly to receive the window, flange and gasket and thus enhance the window-flange compression around gasket 16.

Ring 10 is placed around collar 12 and includes a plurality of detents 9 and window contacting surface 11. As the ring is positioned detents 9 cause further contraction of collar 12. Detents 9 snap in place behind surface 17, as shown in FIG. 3, and thereby securely lock both ring 10 and collar 12 in place. Surface 11 is oblique to window 14 and thereby presses window 14 against gasket 16. This assures a uniform window-flange seal, and additionally secures window 14 in place.

Figure 4:
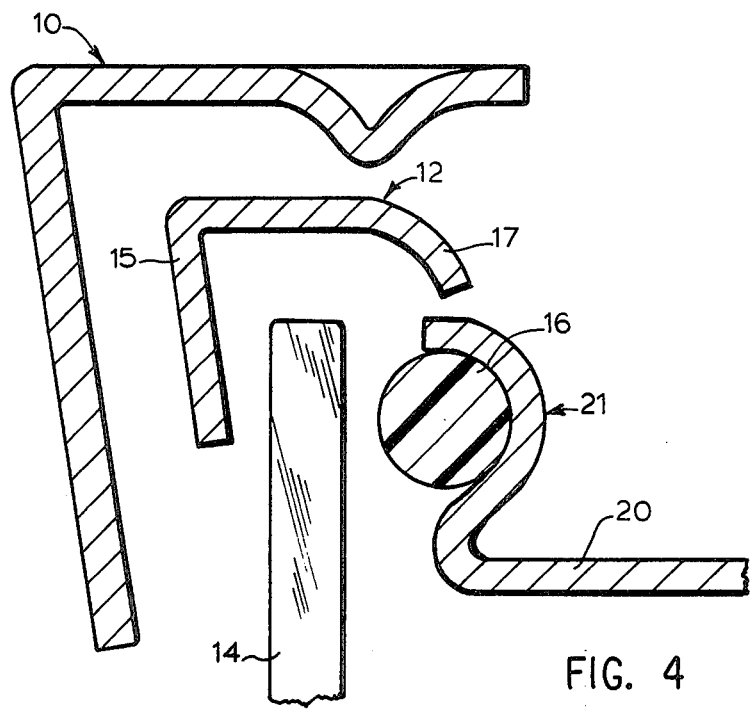
FIG. 4 depicts the window mounting apparatus shown in FIG. 3, without the ring and with the collar expanded.

FIG. 4 of the drawing shows collar 12 when expanded around the window and flange, and it should be observed that in order to provide adequate compression of gasket 16 between window 14 and flange 21 as the collar contracts, the distance between surfaces 15 and 17 (where they are closest together) must be less than the combined thickness of window 14, gasket 16 and flange 21. This distance and the collar's resiliency thereby assure the proper compression of gasket 16 to achieve an effective seal. To assure proper gasket compression, gasket 16 must be sufficiently thick so that window 14 does not contact flange 21.

Only slight or moderate pressure is required to place ring 10 around collar 12. However, because of the cooperation which exists between the ring and the collar, whereby each is locked in place and window 14 is pressed simultaneously against gasket 16, a window mounting arrangement is achieved which effectively prevents window dislodging and fluid or gas leakage from the window. Furthermore, because collar 12 is uniformly contracted around window 14 and flange 21, the seal between the window and the flange likewise is extremely uniform. It should be noticed that because of this cooperation, window 14, or for that matter any similar plate so positioned on the front of case 20, can be mounted and removed easily by hand, and the parts, that is, ring 10, collar 12 and gasket 16 reused. Once again, in this regard, it should be observed that this feature has particular utility when used in conjunction with the method of assembly for a pressure gauge disclosed in the co-pending application bearing Ser. No. 777,207, filed on Mar. 14, 1977, and assigned to the same assignee as designated herein.

While we have described herein that which is at present the preferred embodiment of the invention, it will be obvious to those skilled in the art that there are many possible variations thereto, which nevertheless embrace the true spirit of the invention, and it is intended that all such variations, modifications and equivalents can be covered by the following claims:

We claim:
1. An instrument case comprising:
a container having at least one open end,
a window,
an arcuately shaped flange on the peripheral edge of the open end
an expandable split collar having end portions formed to receive the peripheral edge of said flange and the peripheral edge of said window,
a ring which snaps in place around said collar and causes it to contract,
said end portion resiliently pressing said window against at least a portion of said flange when contracted, and
said ring and collar being removably locked in place on the container when said ring snaps in place.
2. The instrument case of claim 1 wherein:
said end portion includes two sides and narrows towards its peripheral edge, one of said sides is arcuately shaped to receive said flange edge and
said ring includes a plurality of detents which engage the peripheral edge of said collar.
3. The instrument case of claim 2 wherein:
said ring includes a surface which extends from the peripheral edge of the ring pressing said window against said flange portion in conjunction with said collar.
4. An instrument case, comprising:
a container having at least one open end,
a window,
an arcuately shaped flange on the peripheral edge of the open end,
an expandable split collar having end portions formed to receive the peripheral edge of said flange and said window,
a ring which snaps in place around said collar causing it to contract,
a seal disposed in the arcuate portion of said flange
said end portion resiliently pressing said window against said seal when contracted to establish a fluid seal relationship between said window and said flange, and
said ring and collar being removably locked in place on said container.
5. The instrument case of claim 4, wherein:
said end portion includes two sides and narrows towards the collar peripheral edge, one of said sides being arcuately shaped to receive said flange edge, and
said ring includes a plurality of detents which engage the peripheral edge of said collar.
6. The instrument case of claim 5, wherein:
said ring includes a surface extending from the peripheral edge to press said window against said seal in conjunction with said collar.

* * * * *